United States Patent [19]

Maus

[11] 4,250,756
[45] Feb. 17, 1981

[54] APPARATUS FOR BALANCING A ROTATING BODY

[75] Inventor: Otfrid Maus, Darmstadt, Fed. Rep. of Germany

[73] Assignee: Schenck-Auto-Service-Geräte GmbH, Darmstadt, Fed. Rep. of Germany

[21] Appl. No.: 53,254

[22] Filed: Jun. 29, 1979

[30] Foreign Application Priority Data

Oct. 31, 1978 [DE] Fed. Rep. of Germany ....... 2847295

[51] Int. Cl.³ ............................................. G01M 1/16
[52] U.S. Cl. ......................................... 73/459; 73/472
[58] Field of Search ................. 73/459, 460, 462–466, 73/471–473, 477

[56] References Cited

U.S. PATENT DOCUMENTS

| 3,130,587 | 4/1964 | Kinsey et al. | 73/462 |
| 3,182,511 | 5/1965 | Federn et al. | 73/477 |
| 3,812,725 | 5/1974 | Frank et al. | 73/462 |

OTHER PUBLICATIONS

Drawing of Schenck Transducer T-57, Drawing No. 029688.

Primary Examiner—James J. Gill
Attorney, Agent, or Firm—Connolly and Hutz

[57] ABSTRACT

This invention relates to a process and an apparatus for balancing a body of rotation in two parallel balancing planes disposed perpendicular to the rotational axis of the body. A slotted plate disposed substantially perpendicular to axis of rotation of the body conducts the rotary and translatory vibrations to separate transducers. The slots essentially divide the plate into an outer frame and central portion, which are connected by narrow linking strips. The rotary vibrations are transmitted by linking strips which are stressed in bending, whereas the translatory vibrations are transmitted by linking strips which are stressed in tension or compression. Unwanted force factors are eliminated by interposing members between their source and the foundation, such as by mounting the rotating body and slotted plate upon springs, which in some instances may be vertically disposed.

11 Claims, 6 Drawing Figures

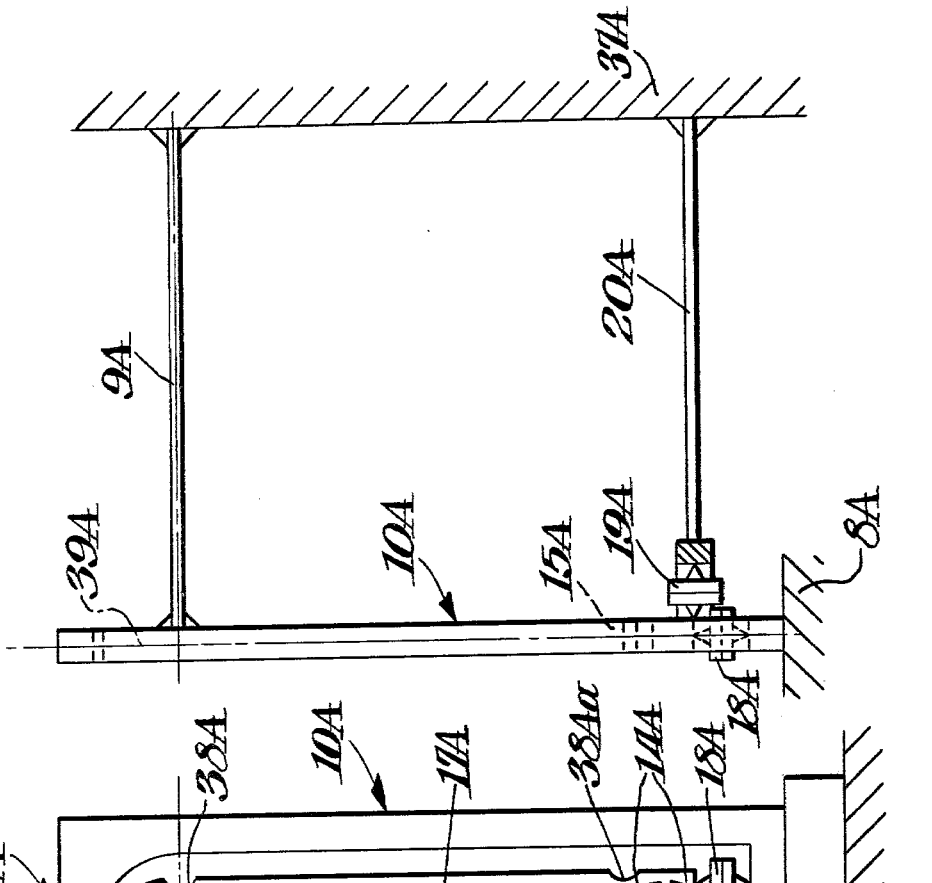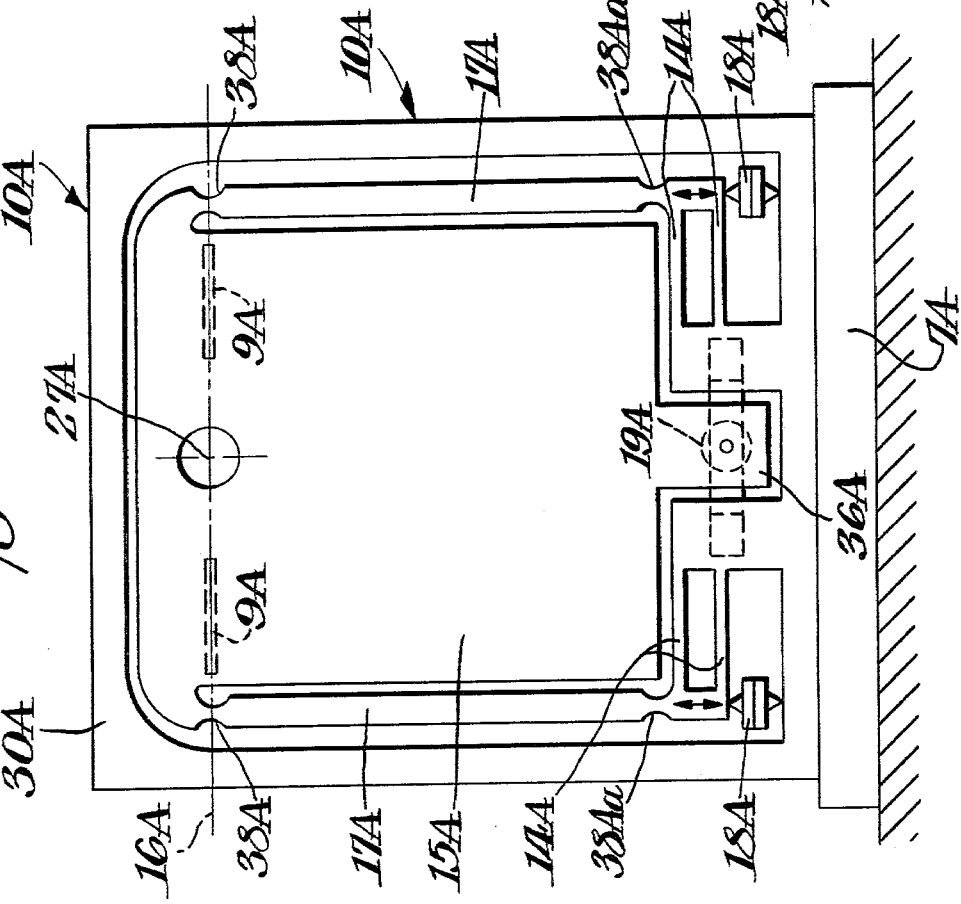

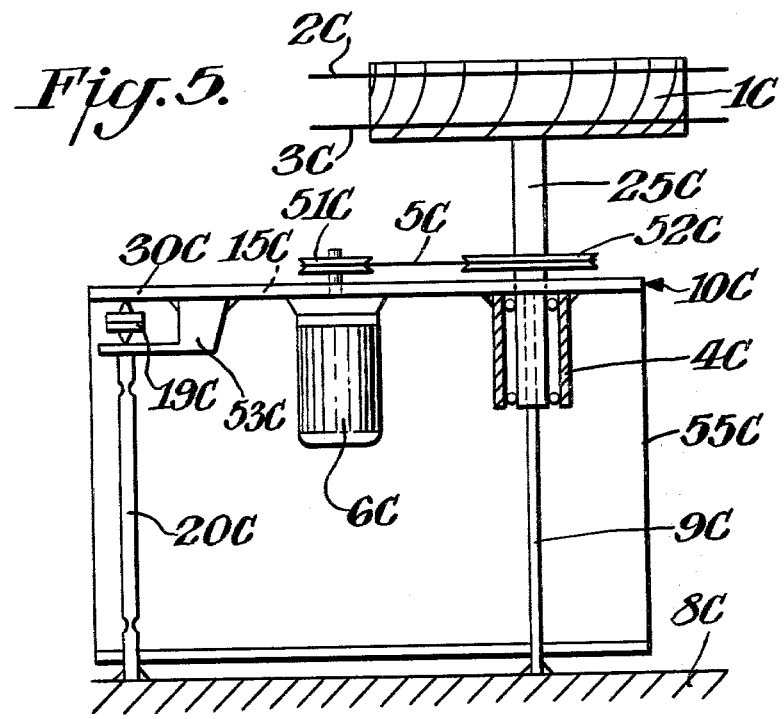
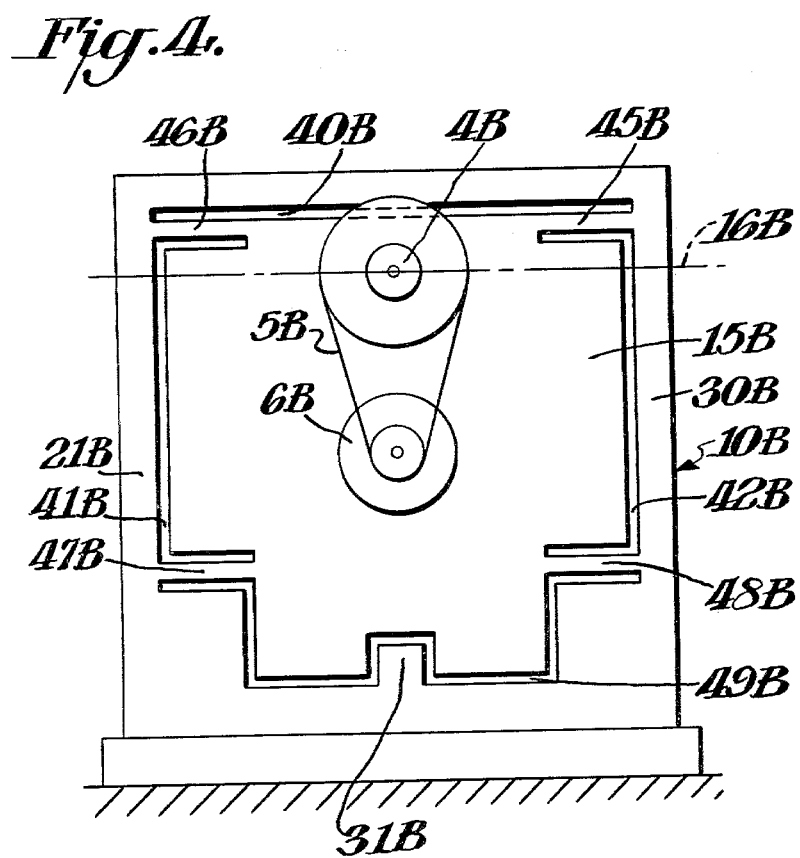

APPARATUS FOR BALANCING A ROTATING BODY

CROSS REFERENCE TO RELATED APPLICATIONS

None.

BACKGROUND OF THE INVENTION

DE-PS1,237,807 discloses a balancing machine with foundation-mounted bearing stand and, swingably braced against it, a bearing support which holds the rotor to be balanced and whose dynamic vibrations are determined in the measuring plane by a measuring transducer, which is characterized in that the springs of the brace for the bearing support constitute with it and the bearing support an undetachable whole. Such a balancing machine is usable for balancing in two planes only when there are used two such bearing stands, connected by means of a foundation with a balancing machine. Here, as a result of a screw connection between the two bearing supports and the foundation, there result transmission difficulties which may affect the measuring. Furthermore, such bearing supports are particularly expensive, and with these bearing supports, provisions are made to avoid a movement of the bearing supports in the direction of the rotational axis of the body of rotation to be balanced.

Furthermore, DE-PS 2,215,002 discloses a subcritically adjusted balancing machine with spring-supported dynamic body mounting and with two stationary measuring value transducers for the balancing of a dynamic body in at least two planes, which is characterized in that the dynamic body mounting occurs in a known manner by means of springs clamped parallel to the rotational axis of the dynamic body. The springs are clamped on one end in a stationary manner and at their other end at the dynamic body mounting in such a manner, however, that a carrier, resistant to bending, is applied at the dynamic body mounting for the coupling of the two signal modulators, whereby the coupling point of the one signal modulator results from the point of intersection of the tangents at the bending line of the spring at both clamping points with a dynamic imbalance effect, and the coupling point of the other signal modulator does not lie at this point of intersection. This balancing machine requires a special extension of its spring support in order to allow the vibrating transformer to be applied at the axis of rotation and in order to effect a clear separation between the vibrations produced by the imbalance momentum and static imbalance in both planes. Furthermore, such a balancing machine is comprised of a plurality of bolted-together parts.

DE-PS 1,698,164 discloses a balancing machine with a mechanical frame for the balancing of a dynamic body in at least two planes, wherein the dynamic body mounting is conducted flexibly between two pairs of leaf springs supporting one another in vibrating directions proceeding toward each other at an angle, which is characterized in that, in a known manner, a first spring arrangement freely leads the axis of rotation of the dynamic body in one direction by parallel arrangement. However, the spring of the other spring arrangement, supported on the first, are arranged at an incline toward each other at such an angle that their theoretical elongations intersect at the level of the one adjusting plane. Such a balancing machine cogently requires a second inclined spring arrangement, supported on springs, whereby the theoretical elongations of these springs must intersect at the level of the one balancing plane. Such a balancing machine is expensive in its construction, and care must be taken that a secure support of the one balancing plane is afforded in the plane in which the theoretical elongations intersect. This necessarily leads in each new body of rotation to additional time-consuming adjusting operations. Furthermore, this balancing machine also comprises a plurality of structural parts, which are bolted together, something which may lead to errors in the transmission of measuring data.

SUMMARY

Emanating from this state of the art, the object of the invention is to provide a balancing procedure and a balancing machine, whereby a measuring of the imbalance in two planes is achieved without a spring support extending along the body of rotation to be balanced or of an axis of rotation for the measuring of the imbalance moments and forces. This object is solved according to the invention in that a plate having flexible portions and disposed parallel to a plane perpendicular to the axis of rotation of the body of rotation, conducts the vibrations resulting from the imbalance existing in the rotational body, as rotary and translatory vibrations, separately to at least one vibration transducer each. By means of the invention, there is achieved first of all a balancing, referring to two arbitrary balancing planes, of the body of rotation by the measurement of the vibrations produced in the rotational body by its imbalance, which vibrations are represented as translatory vibrations and rotary vibrations in a plane. Thus, the previously required input of balancing elements, in order to obtain the most error-free imbalance measurement, is reduced and by means of the novel balancing procedure, furthermore, a balancing of a rotational body in two planes is achieved independent of the direction of the axis of rotation, particularly independent, if the axis of rotation of the body proceeds vertically or horizontally.

Viewed as an embodiment of this novel procedure is that the mechanical vibrations setting in a rotary and translatory vibrations may be taken up perpendicularly to each other by vibration transducers. By the possibility of vertical takeoff of both vibration components of an imbalance vibrations, a clear separation is achieved between the static imbalance and an imbalance moment.

In still another embodiment of the invention, it is suggested that the rotary vibrations produced by the imbalance moment may be transmitted parallel to the axis of rotation and then transmitted parallel to a plane perpendicular to the axis of rotation of the body to be balanced by way of the plate to the vibration transducer. By means of this novel process step, a balancing in two planes is achieved in a single measuring run.

A balancing machine with a bearing stand and an installation for the rotational body to be balanced and with vibration transducers for the execution of the process is distinguished in that the dynamic body mounting is arranged on a slotted plate having a frame and central sections connected by narrow linking strips in such a manner that the rotary vibrations of the plate are transmitted by linking strips which are stressed to bend, and the translatory vibrations of the plate are transmitted by compression and tension-stressed linking strips. The novel balancing machine thus enables the use of dynamometric elements, such as piezo elements or foil strain gauges.

A balancing machine with bearing stand and installation for the rotational body to be balanced and with vibration transducers for the execution of the process is distinguished in that the out-of-balance body mounting is arranged on a slotted plate in such a manner that linking strips are stressed by the effects of imbalance simultaneously by tension, compression, and bending in two spacial, perpendicularly intersecting directions, and that at least two vibration transducers, whose measuring directions are perpendicularly intersecting, measure the strain thereof. Such a novel balancing machine for the execution of the process enables the strain of the plate, caused by imbalance oscillations, to be fed odometrically to electro-mechanical vibration transducers and to supply electrical signals for further processing.

The novel process may thus be carried out by means of pure dynamometry or by means of odometry by balancing machines equipped accordingly.

In yet a further embodiment of the subject matter of the invention, it is suggested that with a vertical arrangement of the rotational axis, the weight of the rotational body be supported against the foundation by means of at least one vertical support and that the reaction force of the vibration transducer for the rotary vibrations be supported by means of a further vertical support against the foundation. As a result of separate support of the rotational axis and of the vibration transducer opposite the foundation, the weight of the rotational body is fully eliminated, and the measuring values are also not influenced by the weight of the plate.

A still further embodiment of the subject matter of the invention is distinguished in that the plate is comprised of one piece. By the one-piece construction of the novel plate, errors no longer occur in the measuring value transmission, which could set in due to a detachable mechanical connection. Should the shape of the isolated sections be produced by the cutting out of plate metal, for example, the tolerance of the sections could be kept very narrow by control of their cross-section. However, it is easily possible, within the framework of the invention, also to produce cast or welded plates as one-piece slotted plates. The designation plate, is not limited to a smooth plate. Encompassed within the protection of the invention are also plate-shaped, slotted configurations, which have depressions and elevations or bearing blocks for the vibration transducers and which are produced in one piece with a slotted configuration.

The conversion of the mechanical vibrations produced by the imbalance existing in a body within the slotted plate, into rotary or translatory vibrations occurs in that the rotational axis, proceeding perpendicularly to the slotted plate, is rotated about a theoretical axis in the slotted plate. The axis proceeds perpendicularly to the rotational axis of the rotational body to be investigated and intersecting it. Due to the rotation of the slotted plate about this axis, there result rotary vibrations which correspond to the imbalance momentum of the body to be investigated and which are picked up by an vibration transducer, whose measuring axis is disposed parallel to the rotational axis of the body to be investigated. The static imbalance component effects a translatory vibrations of the slotted plate in the direction of a plane disposed perpendicular to the rotational axis. This vibration is picked up by at least one vibration transducer whose measuring axis is disposed perpendicular to the rotational axis of the rotational body to be investigated. The mechanical vibrations picked up by both vibration transducers are converted into electrical signals and subsequently are utilized for the determination of the imbalance magnitude in two balancing planes; and, in using a reference angle indicator, also for the determination of the angular position of the imbalance.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 3 is a front view in elevation of another embodiment of this invention employing force transducers;

FIG. 3A is a side view in elevation of the embodiment shown in FIG. 3;

FIG. 4 is a front view in elevation of still another embodiment of this invention; and FIG. 5 is a front view in elevation of a balancing machine with vertically supported dynamic spindle which is a further embodiment of this invention.

DESCRIPTION OF THE PREFERRED EMBODIMENTS

Figure 1:
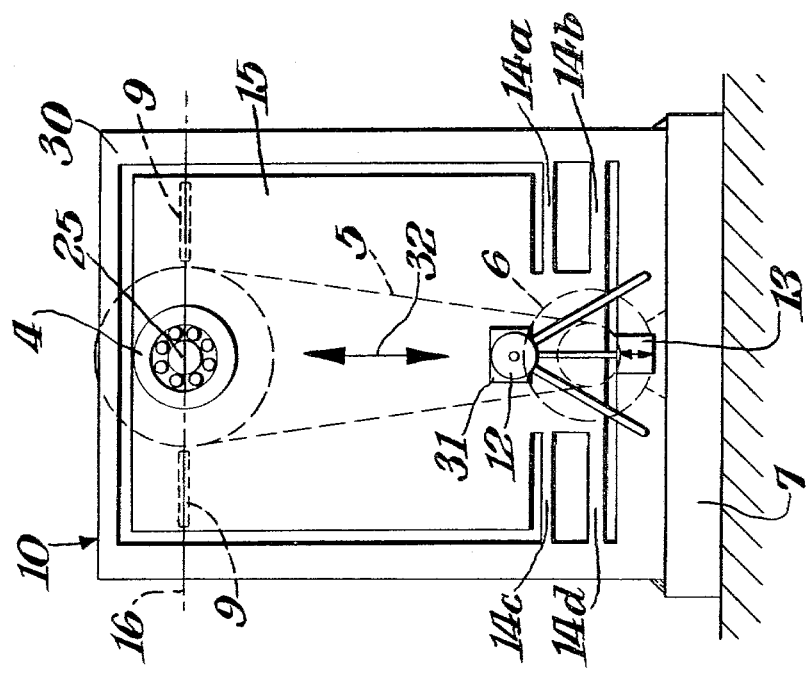
FIG. 1 is a side view in elevation of a novel spring support as a component of a balancing machine with horizontally supported dynamic spindle which is one embodiment of this invention.

According to FIG. 1, a body of rotation to be balanced, in the present instance a fan rotor with balancing planes 2, 3, is held by dynamic spindle 25, which is supported in spindle bearing 4. Spindle bearing 4 is supported on slotted plate 10. Dynamic spindle 25 is driven through V-belt 5, by motor 6, which is mounted on base plate 7. Instead of V-belt 5, any other transmission member between motor 6 and dynamic spindle 25 may also be used for driving spindle 25, such as a geared transmission or a drive shaft. Slotted plate 10 is also connected at its lower end with base plate 7. Furthermore, slotted plate 10 carries vibration transducer 12, whose measuring direction proceeds parallel to rotational axis 27 of dynamic spindle 25 to pick up rotational movements of a center section (see FIG. 2) of slotted plate 10 about an axis 16. This rotational movement about axis 16 corresponds to the imbalance component, which occurs because of the imbalance moments. The imbalance component occurring due to a point force is picked up by further vibration transducer 13, whose measuring direction proceeds parallel to balance plates 2, 3. Vibration transducers 12 and 13 are, for example, Schenck type T 57.

If, as shown in FIG. 1, a fan is utilized as the body of rotation 1 to be balanced, wind forces may set in as a result of rotation, which act in the direction of axis of rotation 27. In order to absorb such axial forces, so that they do not influence the measuring results, a portion of slotted plate 10 is supported by flat springs 9 against stand 11. If necessary, base plate 7 may be firmly connected with foundation 8 in order to secure it against considerable axial forces. The axial thrust can clearly be diverted into the foundation 8 by way of the stand 11.

Figure 2:
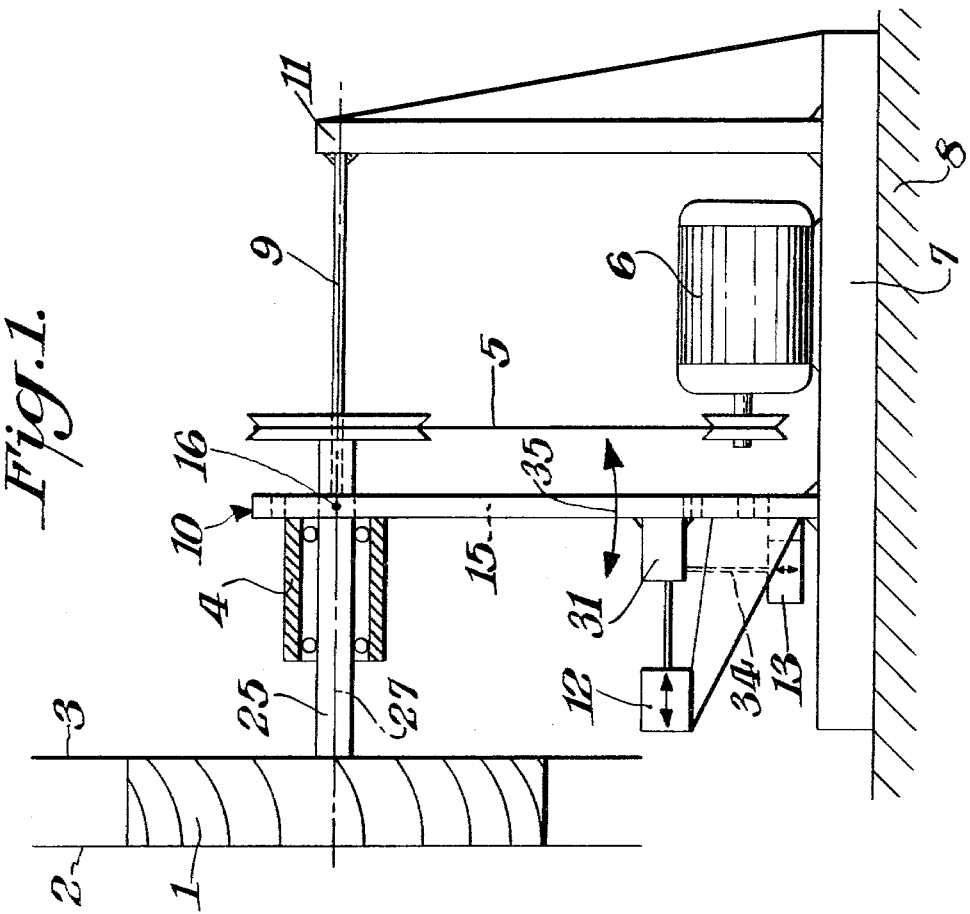
FIG. 2 is a front view in elevation as the embodiment showin in FIG. 1.

The side view of the novel spring support, according to FIG. 2, shows that slotted plate 10 is comprised of frame 30 and a center section 15, flexibly connected to frame 30 by narrow linking strips 14. Movable center section 15 is also supported by means of flat springs 9 (see FIG. 1) against stand 11. Flat springs 9 are arranged in the area of axis of rotation 16, which according to FIG. 2 proceeds horizontally and parallel to base plate 7.

If, by means of spindle bearing 4, an imbalance effect, coming from body of rotation 1 to be balanced, is exerted on center section 15, movable about axis of rotation 16 in the direction of double arrow 35, movable center section 15 attempts to turn itself out of its vertical position, which it assumes in the unstressed state with stand 11. Here, the linking strip 14 to the left and to the right of the point of application 31 of vibration transducer 12 are essentially stressed to bend. The displacement of point of application 31 from its rest position in the direction of action or vibration transducer 12 represents information concerning the magnitude of imbalance moments in balancing planes 2, 3 of body of rotation 1 to be balanced.

The vibrations setting in as a result of the static imbalance existing in rotational body 1 to be balanced, deform the strips 14 in a translatory manner in vertical direction corresponding to double arrow 32, and particularly in the current example, the linking strips 14 are disposed parallel to each other in the form of strips 14a and 14b, 14c and 14d, resp. The vertical vibrating movement of the center section 15 is transmitted to further vibration transducer 13 which engages with axis 34 of point of application 31 in the exemplary embodiment of FIG. 2.

The novel spring support illustrated in FIGS. 3 and 3A is used particularly advantageously in combination with power transducers such as piezo crystals or foil strain guages. The frame 30A of slotted plate 10A is either directly mounted on foundation 8A (see FIG. 3A) or mounted on base plate 7A. By torch cutting, center section 15A is cut out of slotted plate 10A in such a manner that the rotary movements of center section 15A about axis of rotation 16A are transmitted, practically uninfluenced, by means of tongue-shaped extension 36A to dynamometric element 19A which in turn is supportable by means of strut 20A against a further foundation. By the cutting out from the plate material, bumper posts 17A are produced, which are narrowed down at 38, particularly in the area of axis of rotation 16A, to such an extent that they cannot produce any detrimental bending and torsional forces affecting the measuring because of which the rotary movement of center section 15A might be distorted. Bumper posts 17A transmit the translatory tensional and compressive loads, which are conducted by the static imbalance component, to further dynamometric elements 18A, which are arranged between bumper post 17A and frame 30A. Bumper posts 17A per se are disposed parallel to sections 14A in order that a means for introduction into further dynamometric elements 18A is afforded. As schematically illustrated in FIG. 3, bumper posts 17A have further notches 38Aa in addition to the notches 38 in the area of axis of rotation 16A, whereby assurance is given that no disturbing torsional or bending momentums influence the measuring signal to be picked up on further dynamometric elements 18A, said signal subsequently being converted into an electrical signal to be processed further. As already illustrated in FIG. 2, axis of rotation 27A of dynamic spindle 25A (not shown) is supported by means of flat springs 9A on further foundation 37A or on stand 11A (not shown).

Even in this novel spring support, the measuring direction of dynamometric elements 19A is parallel to axis of rotation 27A of the body to be balanced and the measuring direction of two further dynamometric elements 18A, which to the left and to the right of axis of rotation 27A of center section 15A is parallel to a balancing plane within the spring support so that its measuring direction proceeds in a vertical axis 39A according to FIG. 3A.

The further, especially advantageous, novel embodiment of the spring support shown in FIG. 4 is distinguished in that center section 15B also holds drive motor 6B and drive transmission means 5B in addition to spindle bearing 4B. By torch cutting, for example, slotted plate 10B in frame 30B and center section 15B are separated, whereby between slot 40B, on the one hand, and 41B, 42B on the other hand, there is formed a flexible pair of sections 45B, 46B which separate frame 30B from center section 15B above axis of rotation 16B, and whereby, on the other hand, by means of slots 41B, 42B and slot 49B, a second pair of linking sections 47B, 48B is formed, which below axis of rotation 16B remains as a single flexible connection between frame 30B and center section 15B. Due to this novel flexible support, therein drive motor 6B, transmission means 5B, and spindle bearing 4B are supported on center section 15B. Not only are the forces resulting from belt traction picked up in a particularly advantageous manner but dynamometric vibration transducers 12B, 13B (not shown in FIG. 4) may also be arranged at other locations, as illustrated in FIGS. 1 and 2, e.g. in the area of the pair of linking sections 45B, 46B above slot 40B for translatory traction and compressive loads, and vibration transducer 12B may be arranged between axis of rotation 16B and slot 40B for measuring the rotation of center section 15B owing to an imbalance moment. Furthermore, it is possible because of this novel embodiment, as illustrated in FIG. 3 for dynamometric transducers 18B, 19B (not shown in FIG. 4) to arrange several such power transducers if here too the requirement is fulfilled that the rotary vibrations about the axis are picked up by transducers whose measuring axis is parallel to the dynamic spindle axis and the measuring axis of the vibrations produced by the static component of the imbalance vibration is parallel to a balancing plane and proceeds along vertical axis 39B (not shown in FIG. 4).

By respective electrical switching of vibration transducers 12B, 13B or 18B, 19B (not shown) it is also possible that the rotation of center section 15B about axis of rotation 16B is picked up by a vibration transducer (not shown) which is arranged between axis of rotation 16B and slot 40B and is picked up simultaneously by a further vibration transducer (also not shown), which picks up the rotary movement at the point of application. In the same manner, the translatory vibrations, in the direction of the vertical axis, which emanate from static imbalance, may also be picked up by vibration transducers whose measuring axes proceed in or parallel to slotted plate plane 39B (not shown) and which determine the movement of the center section with the aid of slot 40B, on the one hand, and with the aid of slot 49B, on the other hand. Such a novel arrangement has the particular advantage of the possibility of compensating for error influences.

FIG. 5 represents the application of a spring support according to FIG. 4 in a balancing machine, whose dynamic spindle 25C proceeds vertically. Slotted plate 10C at its center section 15C holds spindle bearing 4C and also drive motor 6C including V-belt 5C, which drives dynamic spindle 25C by means of V-belt pulleys 51C, 52C. The body of rotation 1C to be balanced, dynamic spindle 25C and spindle bearing 4C are supported directly on foundation 8C by means of flat springs 9C, while the movement of tongue-shaped extension 36C is measured, with the interpolation of dynamometric element 10C, by means of holder 53C arranged on frame 30C. Holder 53C being supported by means of support 20C opposite foundation 8C. A balancing machine with vertical dynamic spindle is provided thereby, which is supported on a foundation merely by means of flat springs 9C and support 20C, a covering 55C, covering the balancing machine, being free of the influence by imbalance forces.

I claim:

1. An apparatus for balancing a body of rotation mounted in a bearing in two parallel balancing planes disposed perpendicular to the axis of rotation of the body having a balancing machine with bearing stand, means for mounting the body of rotation to be balanced and vibration transducers comprising a dynamic body mounting means mounted on a slotted integral plate, the integral plate having frame and central sections flexibly connected by narrow linking strips, some linking strips are constructed and arranged to transmit rotary vibrations of the body to the tranducer, the some linking strips being stressed in bending, other linking strips being constructed and arranged to transmit translatory vibrations of the body of rotation and to be stressed in tension or compression.

2. An apparatus as set forth in claim 1, characterized in that the some and other linking strips are simultaneously stressed by the effect of imbalance in tension or compression and bending in two spacial perpendicular directions, and at least two vibration transducers whose measuring directions are perpendicularly intersecting are connected to the plate to measure the strain in each of the strips.

3. An apparatus as set forth in any one of claims 1 or 2, wherein a foundation is provided, the weight of the rotational body is directly supported on the foundation by at least one vertically disposed support, and reaction force of the vibration transducer for the rotary vibrations are supported on the foundation through a further vertical support.

4. An apparatus as set forth in claim 3, wherein the vertical supports comprise springs.

5. An apparatus as set forth in any one of claims 1, 2, 3 or 4, wherein the slotted plate comprises one piece.

6. An apparatus as set forth in any one of claims 1, 2, 3, or 4, wherein the slotted plate comprises an outer frame and central section.

7. An apparatus as set forth in claim 6, wherein slotted plate has narrow linking strips disposed in between the outer frame and central section.

8. An apparatus as set forth in claim 7, wherein the central section has a tongue-shaped section.

9. An apparatus as set forth in claim 8, wherein slotted plate has elongated bumper sections.

10. An apparatus as set forth in claim 9, wherein force reading guages are connected to be actuated by the bumper sections.

11. An apparatus as set forth in claim 9, wherein portions of the bumper sections have necked-down cross sections to present transmission of extraneous forces.

* * * * *